United States Patent

Shah et al.

[11] Patent Number: 5,917,804
[45] Date of Patent: Jun. 29, 1999

[54] CONNECTION ADMISSION CONTROL FOR ATM NETWORKS HANDLING CBR AND VBR SERVICES

[75] Inventors: Syed I. A. Shah, Ottawa; Kun Qian; Todd D. Morris, both of Kanata, all of Canada

[73] Assignee: Northern Telecom Limited, Montreal, Canada

[21] Appl. No.: 08/709,460

[22] Filed: Sep. 5, 1996

[51] Int. Cl.⁶ .......................... G01R 31/08; G06F 11/00; G08C 15/00
[52] U.S. Cl. .......................................... 370/230; 370/229
[58] Field of Search ................................. 370/230, 231, 370/232, 233, 234, 389, 395, 468

[56] References Cited

U.S. PATENT DOCUMENTS

| | | | |
|---|---|---|---|
| 5,357,507 | 10/1994 | Hughes et al. | 370/234 |
| 5,530,695 | 6/1996 | Dighe et al. | 370/232 |
| 5,583,857 | 12/1996 | Soumiya et al. | 370/233 |

OTHER PUBLICATIONS

"Effective Bandwidths for the Multi-type UAS Channel", R. J. Gibbens et al, Queueing Systems 9 (1991), pp. 17–28.
"Equivalent Capacity and Its Application to Bandwidth Allocation in High-Speed Networks", R. Guerin et al, IEEE Journal on Selected Areas in Communications, vol. 9, No. 7, Sep. 1991, pp. 968–981.

*Primary Examiner*—Chi H. Pham
*Assistant Examiner*—Steven Nguyen
*Attorney, Agent, or Firm*—Yoshiharu Toyooka; Jeffrey M. Measures

[57] ABSTRACT

In an ATM network, the physical resources are shared by many connection and the bandwidth is allocated virtually to each connection. The connection admission control (CAC) algorithm uses traffic descriptors, desired quality of service (QOS) parameters etc., to compute a required bandwidth for a requested connection by which it makes a decision to admit or reject the connection. For admission control for a requested VBR connection, two required bandwidths are calculated in two different ways, both of which take into consideration impacts of CBR traffic which is being serviced. The admission decision is based on the lesser of the two bandwidths.

6 Claims, 4 Drawing Sheets

CONNECTION ADMISSION CONTROL FOR ATM NETWORKS HANDLING CBR AND VBR SERVICES

FIELD OF THE INVENTION

The present invention relates generally to new connection admission control (CAC) techniques for ATM networks. In particular, it is directed to CAC techniques for variable bit rate (VBR) services for an ATM network in which higher prioritized CBR services are also handled.

BACKGROUND OF THE INVENTION

ATM based broadband networks will support diverse applications ranging from voice and circuit emulation to variable bit rate video and data, each having diverse traffic characteristics. This diversity of traffic poses new challenges in terms of bandwidth allocation and traffic control within the network.

The resource (bandwidth) allocation problems in ATM networks are very different from the ones present in circuit switched or the existing packet switched networks. In existing telephone networks, for example, new connection requests are blocked on the basis of a shortage of trunks. In an ATM node this is not the case, since the physical resources are allocated virtually, and shared by many connections. In other words, all connections are statistically multiplexed onto the same link and yet expect the network to meet certain performance requirements for each connection. The problem of allocating appropriate bandwidth to each connection then becomes a crucial one. Routes are typically selected and connections accepted so as to "optimize" some measure of resources utilization while providing adequate QOS to the carried traffic. This requires knowledge of both the current traffic conditions and the impact of adding a new connection.

The resource allocation procedure hence forth referred to as the connection admission control (CAC) algorithm, uses the connection traffic descriptors (e.g., peak rate, mean rate also referred to as average rate or sustainable bit rate, and maximum burst size) along with the desired QOS parameters (e.g., cell loss, cell delay and cell delay variation) to access the amount of bandwidth required by the connection. The decision to accept or reject a connection is then based on the amount of available bandwidth on the outgoing link, in addition to other parameters which the network administrator may deem necessary to consider.

It should also be noted that although the connection admission control algorithm deals with the cell level performance of a connection, it impacts the call level performance as well via network dimensioning and routing. Both network dimensioning and routing need estimates of required bandwidth for typical connections to determine facility requirements and select appropriate routes respectively.

Generally speaking, in an ATM network a traffic contract is negotiated between the user and the network at each connection setup. The user supplies the traffic characteristics (descriptors), the desired QOS, and the destination address to the network controller. The ATM network controller would pass connection request on to the CAC algorithm. The CAC algorithm then determines whether there is enough free bandwidth available on each hop of the source-destination route to accept the connection.

A connection can belong to one of the four service categories defined by such industry-wide association bodies as ATM FORUM. These service categories are: (1) constant bit rate (CBR) service; (2) variable bit rate (VBR) service; (3) available bit rate (ABR) service; and (4) unspecified bit rate (UBR) service. ATM FORUM defines these services as follows:

The CBR service is for applications and services which have very stringent cell loss, delay and delay variation requirements.

The VBR service is for applications and services which have less stringent cell loss, delay and delay variation requirements than the applications which use the CBR service.

The ABR service is currently being defined by ATM FORUM. This service is meant primarily for data applications such as LAN-to-LAN interconnections.

The UBR service is primarily for data applications. This service has no guaranteed quality of service associated with it. However, the QOS for the UBR service is engineered to meet certain (target) objectives.

The exact problem of bandwidth allocation can be modeled as $\Sigma$ G/D/1/K queuing model. However, the solution to the exact problem is too complicated to meet the real time requirements of a bandwidth allocation algorithm. Therefore suitable approximations must be made. One approximation model is the On/Off fluid flow process.

In "Effective bandwidths for the multi-type UAS channel" by R. J. Gibbens and P. J. Hunt in Queuing Systems (1991) pages 17–28, the uniform arrival and service (UAS) model is used to study traffic offered to a multi-service communication channel. As shown in FIG. 1, a plurality of sources $i=(1, \ldots, N)$ 10 are multiplexed at a multiplexer 12 to an outgoing link 14. The traffic from each source is assumed to be of the On/Off pattern in which the source generates cells at a constant rate $\gamma$ for a period of time $t_1$ and is silent for a period of time $t_2$. The multiplexer 12 has a buffer 16. The rate $\gamma$ is constant, but both $t_1$ and $t_2$ are random variables. The On and Off periods are usually assumed to be exponentially distributed. According to Gibbens and Hunt, the effective bandwidth of i-th CBR connection can be approximated as follows:

$$\alpha_i(\zeta) = \frac{\zeta\gamma_i + \mu_i + \lambda_i - \sqrt{(\zeta\gamma_i + \mu_i - \lambda_i)^2 + 4\lambda_i\mu_i}}{2\zeta} \quad (1)$$

where $T_{1i}$ and $T_{2i}$ are the mean values of the On and Off periods respectively of i-th connection, i.e. $T_{1i}=<t_{1i}>$ and $T_{2i}=<t_{2i}>$. $\mu_i=1/<t_{1i}>$ and $\lambda_i=1/<t_{2i}>$. $\zeta=\ln(\delta)/L<0$. $\delta$ is the cell loss probability and L is the buffer size (expressed in terms of the number of cells it can hold).

In equation (1)

(a) $\zeta=\ln(\delta)/L=0$ (small $\delta$ and infinite buffer size, i.e. $L\rightarrow\infty$) produces the mean bandwidth $r_i$ for connection "i" which is given as $$r_i = \gamma_i \frac{T_{1i}}{T_{1i}+T_{2i}} = \gamma_i \frac{\lambda_i}{\mu_i+\lambda_i}$$

(b) $\zeta=\ln(\delta)/L=-\infty$ (no buffer) produces the peak bandwidth $\gamma_i$ for connection "i".

CACs according to known schemes use aggregates of either peak bandwidth or effective bandwidth, such as $\Sigma\gamma_i$ or $\Sigma r_i$, as the criterion for accepting or rejecting the requested call.

An article entitled "Equivalent Capacity and Its Application to Bandwidth Allocation; in High-Speed Networks" by R. Guerin, H. Ahmadi and M Naghshineh in IEEE Journal on Selected Areas in Communications Vol. 9, No. 7, Sep.

1991, pages 968–981, describes also in detail the CACs based on the fluid flow model and the stationary bit rate approach using Gaussian approximation. The article mentions that:

Because all connections are statistically multiplexed at the physical layer and the bit rate of connections varies, a challenging problem is to characterize, as a function of the desired grade of service, the effective bandwidth requirement of both individual connections and the aggregate bandwidth usage of connections multiplexed on a given link. This information is provided by accounting (on each link) for the amount of bandwidth currently allocated to accommodate existing connections, and by identifying how much additional bandwidth needs to be reserved on links over which a new connection is to be routed. Because of the statistical multiplexing of connections and shared buffering points in the network, both the accounting and reservation are based on some aggregate statistical measures matching the overall traffic demand rather than on physically dedicated bandwidth or buffer space per connection. In addition to the inherent complexity of such a matching, another major challenge is to provide these traffic control functions in real-time, upon the arrival of a connection request. The corresponding procedures must, therefore, be computationally simple enough so that their overall complexity is consistent with real-time requirements.

The article then reports that:

we propose a computationally simple approximation for the equivalent capacity or bandwidth requirement of a single or multiplexed connections on the basis of their statistical characteristics. When connections are statistically multiplexed, their aggregate statistical behaviour differs from their individual statistical representation. One needs, therefore, to define new metrics to represent the effective bandwidth requirement of an individual connection as well as the total effective bandwidth requirement of connections multiplexed on each link. The purpose of the equivalent capacity expression is to provide a unified metric to represent the effective bandwidth of a connection as well as the effective aggregated load on network links at any given time. These link metrics can then be used for efficient bandwidth management, routing, and call control procedures.

Guerin et al considered two approximations, fluid flow approximation and stationary approximation. The fluid flow approximation is substantially same as the one discussed by Gibbens and Hunt referenced above. This approximation produces the effective bandwidth for connection (i) as $c_i$.

The stationary approximation results in an equation of $$C(s) = m + \alpha'\sigma \text{ with } \alpha' = \sqrt{-2\ln(\epsilon) - \ln(2\pi)}$$

where m is the mean aggregate bit rate and $\sigma$ is the standard deviation of the aggregate bit rate and e is the buffer overflow probability.

Finally the article states that the equivalent capacity C is taken to be the minimum of $$C = \min\left(m + \alpha'\sigma, \sum_{i=1}^{N} c_i\right)$$

where N is the number of multiplexed connections.

Guerin et al uses this equivalent bandwidth as the criterion for accepting or rejecting the requested call.

As discussed above, constant bit rate connections are ideally characterized by periodic cell arrivals at the switch or multiplexer. However, in reality due to buffering in the customer premises equipment (CPE) and the upstream switches the traffic characteristics of the CBR connections change from a well behaved periodic (100% correlated) cell stream to a stochastic (or less correlated) cell stream with cell inter-arrival times distributed according to the delay experienced by the cell in the queues. This variation in the inter-arrival time causes the peak rate of the connection to momentarily increase or decrease around the application's peak rate, resulting in an increase in the buffer and bandwidth requirements. This increase in the buffer and bandwidth requirements is dependent on the absolute value and distribution of cell delay variation (CDV).

Therefore, the amount of bandwidth allocated to CBR connections is a function of: (1) peak rate of the connection; (2) the CDV value and distribution; (3) the available buffering; and (4) the QOS requirements of the connections. Hence an admission control scheme discussed above will not work in many cases where CDV and available buffering must be taken into consideration.

The known approximation schemes such as those discussed above have not addressed these effects and the invention improves the calculation of required bandwidth by taking into account of CDV cell delay variation and available buffering.

The applicant's copending application Ser. No. 08/709,455 filed Sep. 5, 1996 and incorporated herein describes a new CAC for CBR services in which CDV impact is considered. According to one embodiment of the invention described therein, when a new CBR connection request is received, the CAC process for CBR takes in the following inputs for the requested connection; (1) connection traffic parameters (peak rate, cell delay variation tolerance); (2) QOS values (cell loss ratio, cell delay and cell delay variation); (3) buffer size; (4) input link rate; and (5) output link rate. Once the inputs are received, the required bandwidth is calculated using algorithm described therein and is then compared against the available bandwidth to determine whether the connection can be accepted or not.

In the system which serves two different traffic, CBR and VBR services, CBR services are given higher priority over VBR services. Therefore, in the system shown in FIG. 2, two buffers 20 and 22 are provided for two types of traffic, high priority and low priority traffic which are multiplexed to an output link 24. When a CBR connection is requested, the required bandwidth for the requested connection is calculated as described above and the decision to accept or reject is performed by CAC. When a VBR connection is requested, CAC calculates the required VBR bandwidth for the requested connection. Therefore, the required VBR bandwidth must be modified according to the expected utilization of CBR traffic. In other words, the high priority buffer cannot be shared by the low priority traffic but the low priority buffer may be shared by the higher priority traffic.

The output link capacity shared by the two queues is denoted by "$\kappa$". Let "$\rho_h$" and "$\rho_l$" be the utilization of the high and the low priority queues respectively. The congestion in a multiplexer can be attributed to two main phenomena; (1) cell level and (2) burst level. The cell level congestion occurs when the buffer in the queues fail to accommodate simultaneous cell arrivals from different sources, whereas, the burst level congestion occurs when the buffers fail to accommodate simultaneous burst arrivals from sources. If the amount of buffers available in the multiplexer is greater than N, the number of existing connections, then the cell level congestion would be eliminated. Since the available buffering in any ATM switch far exceeds the number of possible connections that can be supported, the following discussion limits to the problem of burst level congestion.

OBJECT OF THE INVENTION

It is an object of the invention to provide a CAC process for VBR services in an ATM network which handles CBR and VBR connections.

It is another object of the invention to provide a CAC process for VBR and CBR services in an ATM network in which the required bandwidth for the VBR services is calculated by taking into consideration impacts by the CBR services.

It is a further object of the invention to provide a CAC process for VBR and CBR services in an ATM network in which the required bandwidth for the VBR services is calculated in two different ways to generate two values, lesser of which is selected for the CAC decision.

It is yet an object of the invention to provide a system for controlling the connection admission in an ATM network which is handling VBR and CBR services.

SUMMARY OF THE INVENTION

Briefly stated, in one aspect the invention is directed to a connection admission control process for an ATM switching network handling CBR and VBR traffic. The process comprises steps of receiving a VBR connection request specifying QOS parameters, receiving the VBR connection request specifying connection traffic descriptors and receiving network state parameters. The process further includes steps of selecting the lesser of two values $C_1$ and $C_2$ as a required bandwidth C for accepting the requested connection, which two values are calculated respectively according to two predetermined equations using the QOS parameters, connection traffic descriptors and network state parameters, and determining to accept the connection request if C<A, where A is an available network bandwidth.

According to another aspect, the invention is directed to a connection admission control system for an ATM switching network handling CBR and VBR traffic. The system comprises a high priority buffer for buffering the CBR traffic and a low priority buffer for buffering the VBR traffic. The high priority circuit has a computing circuit which computes the bandwidth requirement for the high priority traffic and the low priority circuit has a computing circuit which includes two computing schemes for computing two bandwidth values $C_1$ and $C_2$ for the low priority traffic. The low priority circuit has a comparator for choosing the lesser of the two bandwidth requirements $C_1$ and $C_2$ for connection admission. The system further includes a decision circuit for determining whether or not to accept a connection request based on the lesser or the two bandwidth requirements.

DETAILED DESCRIPTION OF THE PREFERRED EMBODIMENTS OF THE INVENTION

Figure 1:
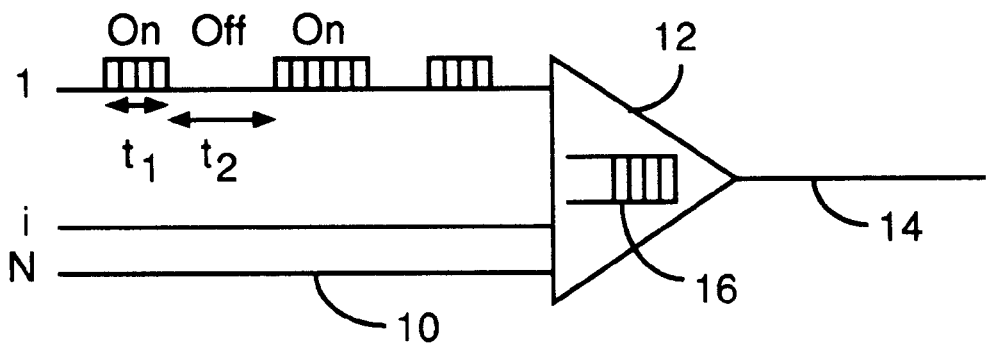
FIG. 1 is a model used for fluid flow approximation scheme.
Figure 2:
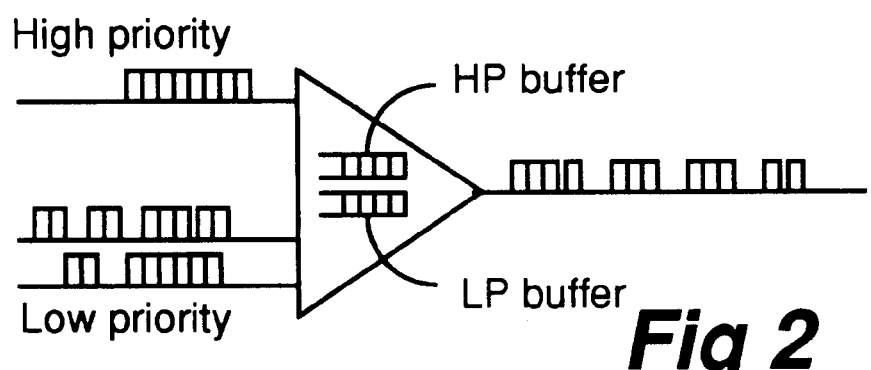
FIG. 2 illustrates a multiplexing system which handles high priority and low priority traffic.

There are several approximation schemes for calculating the required bandwidth for VBR traffic. (1) the effective bit rate approach based on the fluid flow model, (2) the virtual cell loss probability approach using Chernoff bounds, (3) the stationary bit rate approach using Gaussian approximation, and (4) the $M^X/D/1$ queuing model are a few of such schemes.

It has been decided that the fluid flow approach and the virtual cell loss approach are more useful for the purpose of the invention. The required bandwidth is called virtual bandwidth or effective bandwidth in this specification. The virtual bandwidth and effective bandwidth calculations used in the past are either restricted to a limited range of connection characteristics or of limited flexibility since they essentially rely on sets of curves, obtained by analysis or simulation, which are to be used as guidelines to determine the equivalent bandwidth of connections. Specifically, the effective bandwidth calculation requires storage of the precomputed curves at the bandwidth management control points. In addition, the static nature of the information may not accurately reflect the dynamic and changing nature of real-time network traffic conditions and connections characteristics.

As in the case or CBR traffic, in this invention the effective bandwidth is calculated in the fluid flow model which is used for CBR and described above with the exception that for VBR connections, the expected utilization of CBR connections must be taken into consideration. The virtual bandwidth is calculated using the virtual cell loss model which will also be described in detail later. The virtual bandwidth calculation is modified. This modification is necessary to reduce the computation time required for real time resource allocation. The fluid flow and the virtual bandwidth approaches are further modified to include delay priorities. This modification is required because there are two queues in the present system to support VBR and CBR services.

The two state fluid flow model captures the basic behavior of a data source and also corresponds to the traffic parameters used in the standards to characterize the behavior of a variable bit rate source. For exponentially distributed "On/Off" periods, the source is completely characterized by the peak rate of the connection (v), the mean rate of the connection (avg), and the maximum burst size (MBS). The maximum burst size (MBS), gives some indication of how the data is being generated by the source and has impact on the amount of resources allocated to the connection. Two connections with identical mean and peak rate but different burst sizes would generally be allocated different amount of resources. The rationale for choosing this model is that it is simple and flexible enough to be extended to represent traffic characteristics of very diverse sources ranging from variable bit rate video to constant bit rate circuits, such as DS1/DS3 circuits.

Scheme I

Calculation of required bandwidth C1 based on the fluid flow method

The fluid flow approximation for CBR traffic has been discussed in detail above. The required bandwidth of connections for VBR traffic is obtained in very much similar in nature to that for the single priority traffic model discussed above.

However, as mentioned above, the bandwidth available to the lower priority buffer is dependent on the state of the high priority buffer, i.e., when the high priority buffer is not empty the capacity available to the low priority traffic stream is zero, and C when the high priority buffer is empty. Let $Q^h(t)$ and $Q^l(t)$ represent the states of the high priority and low priority buffers at time t and let $R_h$ and $R_l$ be the rates of the aggregate traffic in the high and low priority buffer respectively. Therefore, the dynamics of such a system can then be represented by the following:

$$\frac{dQ^h}{dt} = R_h - \kappa$$

$$\frac{dQ^l}{dt} = R_l - \kappa I_{\{Q^h(t)=0\}}$$

where the dependency of the lower priority buffer on the high priority buffer is captured by state dependent variable 'I'$\epsilon\{0,1\}$, which depends on the state of the high priority buffer. The behavior of the high priority buffer can be described in terms of the 'Busy' and 'Idle' periods. Therefore, I(t)=0 when the high priority buffer is in the busy period and otherwise if it is in the 'Idle' period.

This expression is extended to a multiplexing system with several sources by using the decomposition technique. Equation (1) discussed earlier is therefore modified by using following input and intermediate parameters.

Input parameters are:
Peack cell rate (PCR) of the connection (v) in cells/sec
Sustainable cell rate (SCR) of the connection (avg) in cells/sec.
Maximum burst size (MBS) in cells.
Cell loss probability of the VBR service (Ploss).
Expected utilization fo high priority (CBR) traffic (ph).
Buffer size (B) in cells.
Outgoing link rate (k) in cells/sec.
Tuning factor (p)
Following intermediate parameters are computed:

$$a_0 = \zeta[\lambda + \alpha], \quad \mu = \frac{v}{MBS}, \quad \rho_i = \frac{avg}{v}, \quad \alpha = \kappa,$$

$$s_1 = \frac{10^{-7}}{v}, \quad s_2 = \frac{13.8}{v}$$

$$\lambda = \frac{\rho\mu}{(1-\rho)}, \quad \rho_2 = \rho_h \times \frac{avg}{\kappa(1-\rho_h)}, \quad \beta = \rho_2\frac{\alpha}{1-\rho_2}, \quad \zeta = \frac{\ln\left[\frac{Ploss}{\rho_1}\right]}{B}$$

Required bandwidth $C_1$ is calculated as follows:

$$C_1 = \pi\left(\frac{b + \sqrt{b^2 - 4ac}}{2a}\right)$$

where $$a_0 = \zeta[\lambda + \alpha], \ b_0 = \zeta\lambda, \ c_0 = \mu\zeta, \ d_0 = \zeta[v\zeta + \alpha + \mu]$$

$$a = a_0 d_0 - c_0 b_0,$$

$$b = a_0 d_1 + a_1 d_0 - b_0 c_1 - b_1 c_0, \ c = a_1 d_1 - b_1 c_1$$

$$a_1 = \lambda[\lambda + \beta + \alpha + \mu], \ b_1 = \lambda[v\zeta + \alpha + \mu + \lambda + \beta]$$

-continued $$c_1 = \mu[v\zeta + \lambda + \alpha + \mu + \beta],$$

$$d_1 = [v\zeta + \mu + \beta][v\zeta + \alpha + \mu] - \alpha\beta + \lambda\mu$$

Scheme II
Calculation of required bandwidth $C_2$ based on the cell loss probability method
Required bandwidth $C_2$ is calculated as follows:

$$C_2 = \pi\left(\frac{\ln[\rho(e^{sv} - 1) + 1]}{s} - \frac{\ln[Ploss(N)(avg)s]}{sN}\right) -$$

where $$Num = \frac{\kappa(1.0 - \rho_h)}{C_1}, \ N = \ln 2\left[1 + \frac{v}{avg}\right]Num$$

$$Y_1 = \frac{N(avg)s_1}{\rho(1 - e^{-s_1 v})} - N\ln[\rho(e^{s_1 v} - 1) + 1]$$

$$Y_2 = \frac{N(avg)s_2}{\rho(1 - e^{-s_2 v})} - N\ln[\rho(e^{s_2 v} - 1) + 1]$$

$$y_1 = -\ln[Ploss] - \ln[s_1] + 1$$

$$y_2 = -\ln[Ploss] - \ln[s_2] + 1$$

$$z_1 = \frac{Y_2 - Y_1}{s_2 - s_1}, \ z_2 = \frac{y_2 - y_1}{s_2 - s_1}$$

$$s = \frac{y_1 - Y_1 - s_2 z_2 + s_1 z_1}{z_1 - z_2}$$

As described above, the algorithm consists of two calculation schemes in order to cover the whole range of traffic types. It has been found that the scheme I works well in the low peak to mean ratio and small burst size region. However, it overestimates the required bandwidth in the high peak to mean ratio and large burst size region. The scheme II works well in the large burst and high peak to mean ratio region. For example, if a connection has a peak rate of 22.6 Mbits/sec., mean rate of 5.65 Mbits/sec., and a burst size of 40 cells, schemes I and II will estimate the required bandwidth for the connection as 6.8 Mbits/sec. and 11.25 Mbits/sec. respectively. However, if the burst size is increased to 400 cells, keeping all the other parameters constant, the resulting schemes I and II bandwidths are 16.46 Mbits/sec. and 11.25 Mbits/sec. respectively.

Figure 3:
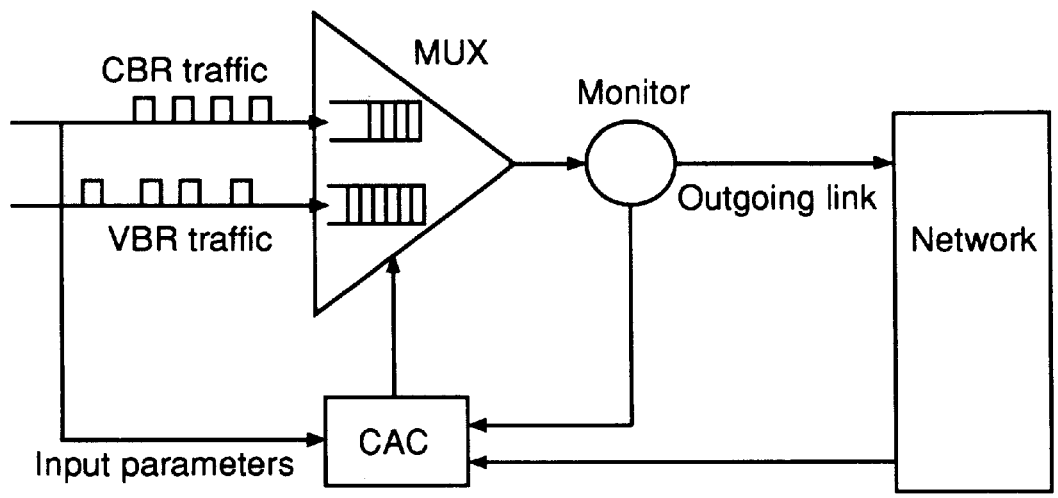
FIG. 3 is a schematic illustration of CAC process according to one embodiment of the invention.
Figure 4:
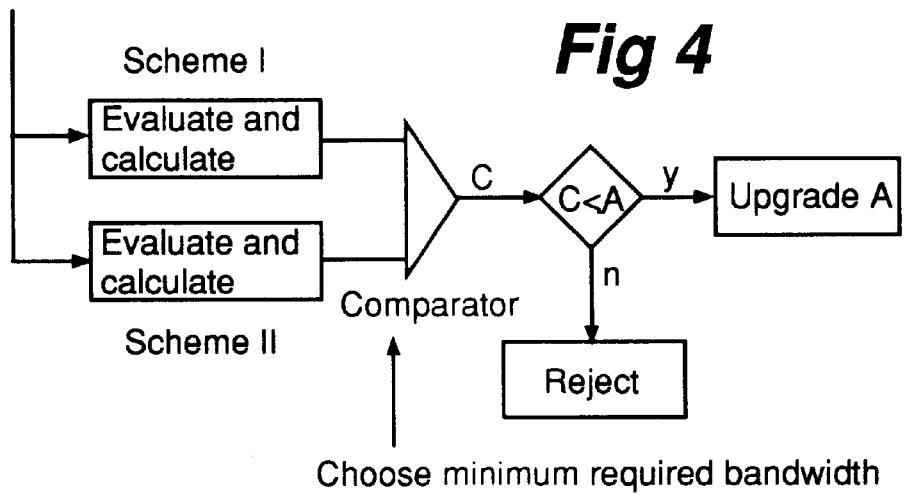
FIG. 4 is a algorithmic flow chart of CAC process according to one embodiment of the invention.

FIG. 3 shows one embodiment of the invention. In the figure there are two buffers, one for high priority (CBR) traffic and another for low priority (VBR) traffic which are multiplexed to an outgoing link. An algorithmic chart for CAC for VBR traffic is shown in FIG. 4. For the purpose of improving the efficiency of the CAC algorithm, the present invention uses a comparator which chooses the minimum bandwidth of the two results obtained in schemes I and II.

The inputs to the algorithm are; (1) connection traffic parameters such as peak cell rate, sustainable cell rate, and burst tolerance or maximum burst size; (2) QOS values such as cell loss ratio and cell delay; (3) and the expected CBR traffic load.

Figure 5:
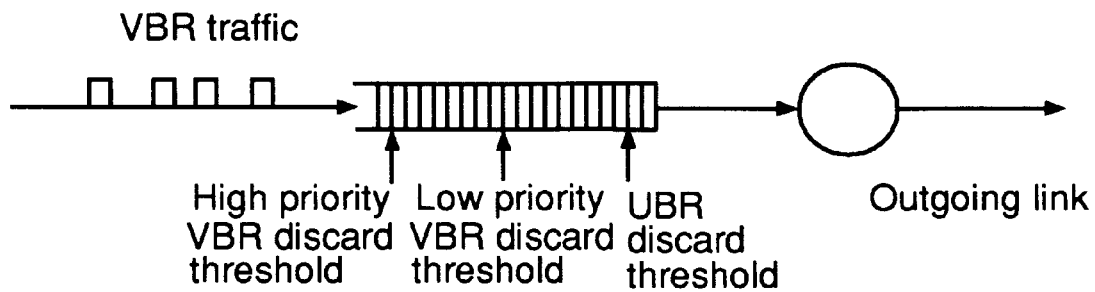
FIG. 5 is a schematic illustration of CAC process according to another embodiment of the invention.
Figure 6:
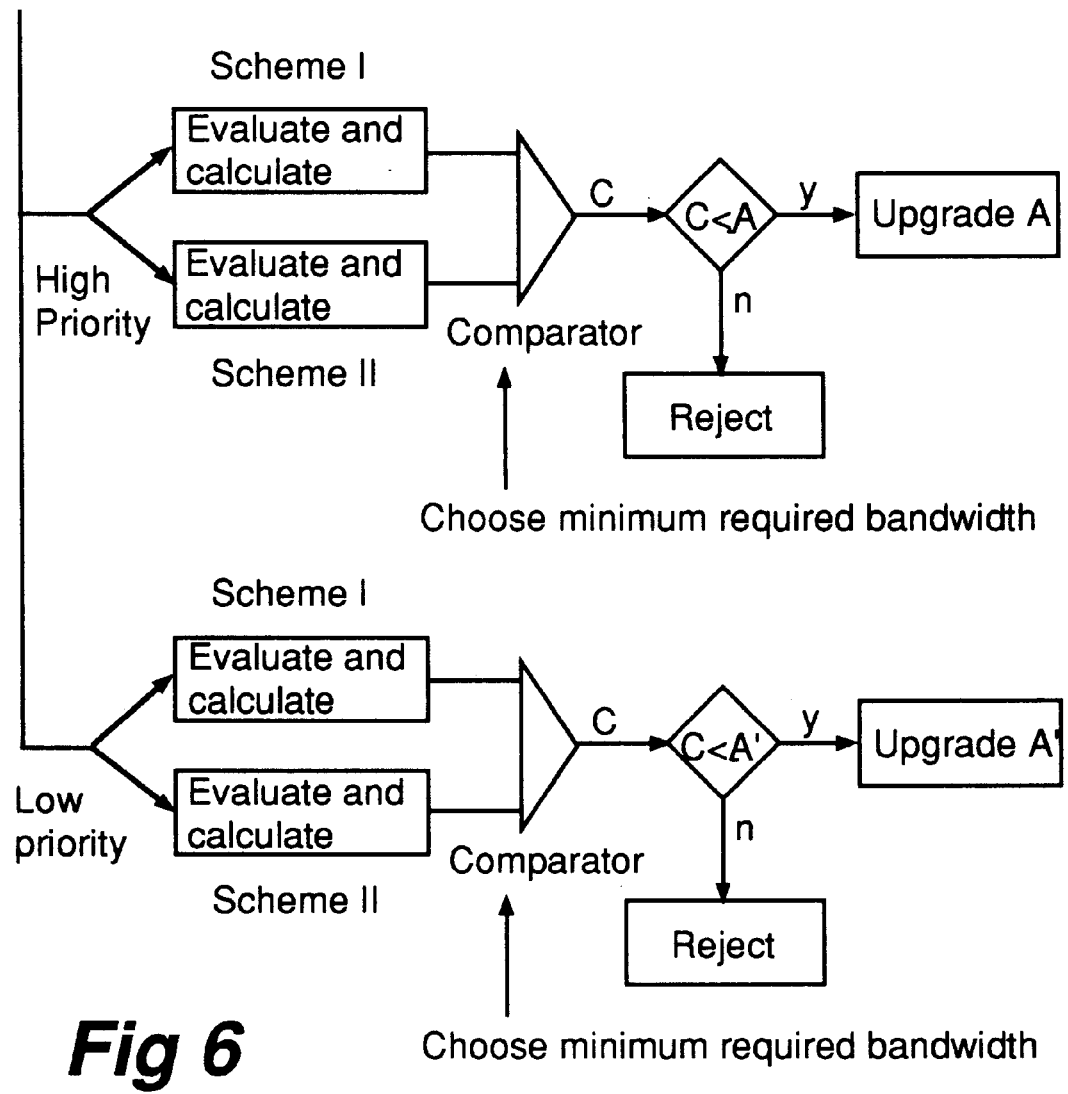
FIG. 6 is a algorithmic flow chart of CAC process according to another embodiment of the invention.

FIGS. 5 and 6 show another embodiment of the invention in which permits two levels of guaranteed VBR QOS in a system with multiple discard thresholds on the low priority VBR queue.

The VBR CAC for thresholds is developed keeping in mind that the thresholds will be appropriately set. The thresholds on the queues are based on the expected load that is offered to the switch for each category of service, high priority VBR, low priority VBR and UBR traffic. The CAC VBR algorithm then treats the high and low priority VBR service connections as independent of each other and guarantees that the sum of the bandwidth allocated to the connections of the respective categories does not exceed their reserved bandwidths. The buffer size (B) is set for each VBR priority.

Figure 7:
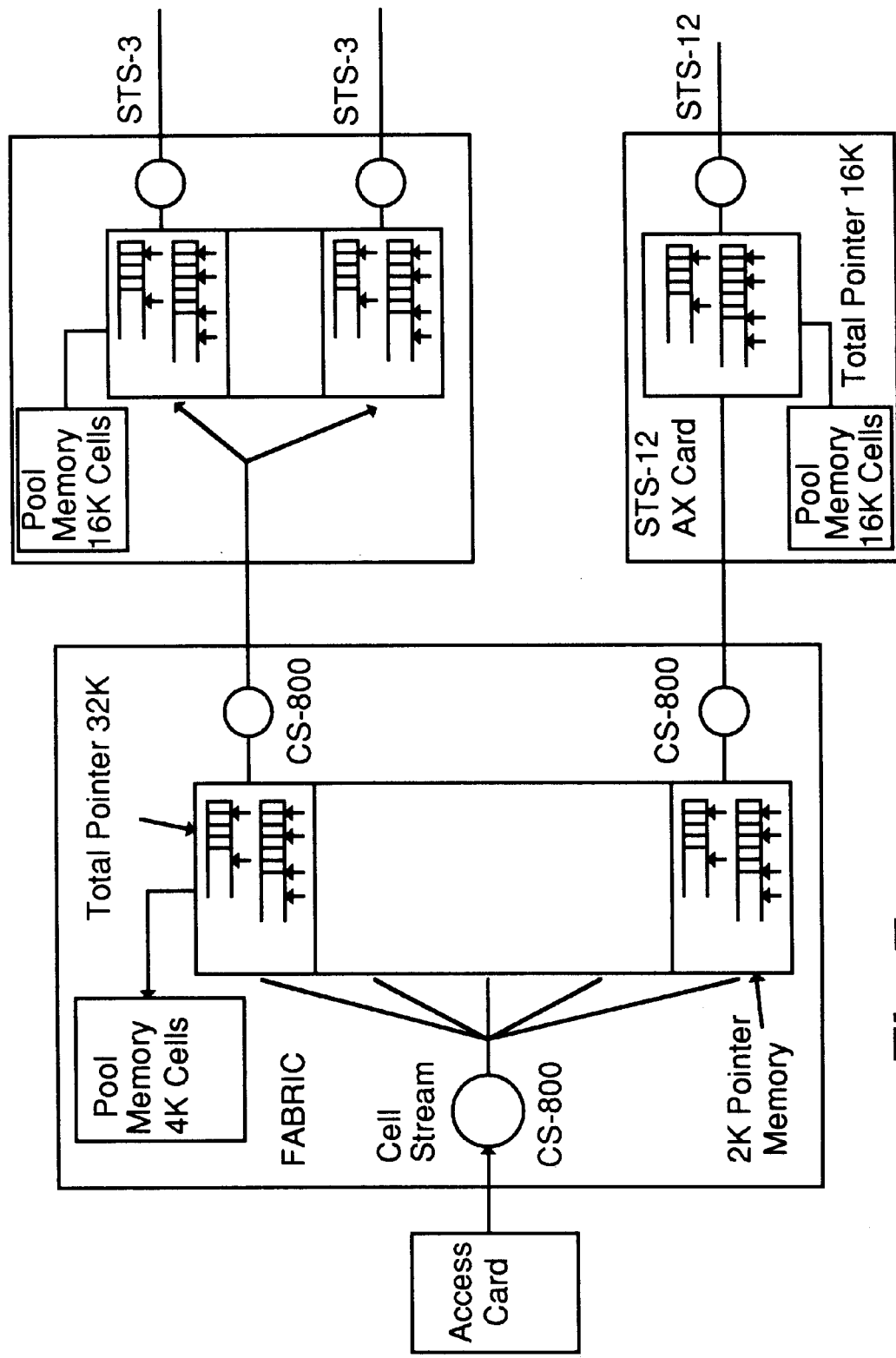
FIG. 7 is a schematic illustration of an ATM switch architecture according to one embodiment of the invention.

FIG. 7 show schematically an ATM switch architecture according to one embodiment. This architecture has a 16×16 common memory switch fabric with the option of OC3 and OC12 access cards. There are two delay priority queues each with two discard thresholds for the high priority and four discard thresholds for the low priority. The high priority queue is used for CBR service and/or any other service requiring low delay and low loss performance. The lower priority queue is used by the VBR and UBR services. The common memory has a capacity of storing 4 K and 16 K ATM cells in the switch fabric and the access cards respectively. Each output port in the fabric has a 2 K cell pointer memory. The access card has the same queuing and discard threshold structure as the switch fabric. The switching fabric is N times the speed of the interface cards. The link connecting the switch fabric to the access cards has a speed of 800 Mbits/sec.

What is claimed is:

1. A connection admission control process for an ATM switching network handling CBR and VBR traffic comprising steps of:

receiving a VBR connection request specifying QOS parameters, receiving the VBR connection request specifying connection traffic descriptors, receiving network state parameters, selecting the lesser of two values $C_1$ and $C_2$ as a required bandwidth C for accepting the requested connection, which two values are calculated respectively according to a first predetermined equation derived from a fluid flow model and a second predetermined equation derived from a cell loss probability model, both using the QOS parameters, connection traffic descriptors, a tuning factor $\pi$ and network state parameters which include expected utilization of CBR traffic, and determining to accept the connection request if C<A, where A is an available network bandwidth.

2. A connection admission control process for an ATM switching network handling CBR and VBR traffic according to claim 1, comprising a further step of updating the available bandwidth with the calculated required bandwidth C.

3. A connection admission control process for an ATM switching network handling CBR and VBR traffic according to claim 1 wherein: the connection traffic descriptors are a peak cell rate, a meximum burst size, and an incoming link rate, and the QOS parameters are a cell loss probability and a sustainable cell rate.

4. A connection admission control process for an ATM switching network handling CBR and VBR traffic according to claim 3 wherein: the network state parameters are a buffer size and an outgoing link rate.

5. A connection admission control process for an ATM switching network handling CBR and VBR traffic according to claim 4, wherein:

v: the peak cell rate of connection in cells/sec, avg: sustainable cell rate in cells/sec, MBS: maximum burst size in cells, $\kappa$: outgoing link rate in cells/sec, Ploss: cell loss probability for CBR traffic, B: buffer size in cells, $\rho h$: expected utilization of CBR traffic and $\pi$: tuning factor, further comprising steps of:

evaluating following values, $$a_0 = \zeta[\lambda + \alpha], \ \mu = \frac{v}{MBS}, \ \rho = \frac{avg}{v}, \ \alpha = \kappa, \ s_1 = \frac{10^{-7}}{v},$$

$$s_2 = \frac{13.8}{v} \ \lambda = \frac{\rho\mu}{(1-\rho)}, \ \rho_2 = \rho_h \times \frac{avg}{\kappa(1-\rho_h)}, \ \beta = \rho_2 \frac{\alpha}{1-\rho_2},$$

$$\zeta = \frac{\ln\left[\frac{Ploss}{\rho}\right]}{B}$$

-calculating $C_1$ as follows:

$$C_1 = \pi\left(\frac{b + \sqrt{b^2 - 4ac}}{2a}\right)$$

where $a_0 = \zeta[\lambda + \alpha], \ b_0 = \zeta\lambda, \ c_0 = \mu\zeta, \ d_0 = \zeta[v\zeta + \alpha + \mu]$ $a = a_0 d_0 - c_0 b_0,$ $b = a_0 d_1 + a_1 d_0 - b_0 c_1 - b_1 c_0, \ c = a_1 d_1 - b_1 c_1$ $a_1 = \lambda[\lambda + \beta + \alpha + \mu], \ b_1 = \lambda[v\zeta + \alpha + \mu + \lambda + \beta]$ $c_1 = \mu[v\zeta + \lambda + \alpha + \mu + \beta],$ $d_1 = [v\zeta + \mu + \beta][v\zeta + \alpha + \mu] - \alpha\beta + \lambda\mu,$ and calculating $C_2$ as follows:

$$C_2 = \pi\left(\frac{\ln[\rho(e^{sv} - 1) + 1]}{s} - \frac{\ln[Ploss(N)(avg)s]}{sN}\right) -$$

where $$Num = \frac{\kappa(1.0 - \rho_h)}{C_1}, \ N = \ln 2\left[1 + \frac{v}{avg}\right]Num$$

$$Y_1 = \frac{N(avg)s_1}{\rho(1 - e^{-s_1 v})} - N\ln[\rho(e^{s_1 v} - 1) + 1]$$

$$Y_2 = \frac{N(avg)s_2}{\rho(1 - e^{-s_2 v})} - N\ln[\rho(e^{s_2 v} - 1) + 1]$$

$y_1 = -\ln[Ploss] - \ln[s_1] + 1$ $y_2 = -\ln[Ploss] - \ln[s_2] + 1$ $$z_1 = \frac{Y_2 - Y_1}{s_2 - s_1}, \ z_2 = \frac{y_2 - y_1}{s_2 - s_1}$$

$$s = \frac{y_1 - Y_1 - s_2 z_2 + s_1 z_1}{z_1 - z_2}.$$

6. A connection admission control process for an ATM switching network handling CBR and VBR traffic according to claim 5 wherein the VBR traffic has two or more priorities and the process further comprising a step of:

determining to accept the connection request if the required bandwidth C for the requested connection is less than the available bandwidth which corresponds to the priority of the requested connection.

* * * * *